United States Patent [19]
Maeda

[11] Patent Number: 5,367,233
[45] Date of Patent: Nov. 22, 1994

[54] BRUSHLESS MOTOR OPERATING APPARATUS PROVIDED WITH A FILTER HAVING A VOLTAGE DIVIDER CIRCUIT

[75] Inventor: Shiro Maeda, Kusatsu, Japan

[73] Assignee: Matsushita Electric Industrial Co., Ltd., Osaka, Japan

[21] Appl. No.: 53,807

[22] Filed: Apr. 29, 1993

Related U.S. Application Data

[63] Continuation of Ser. No. 768,545, Sep. 30, 1991, abandoned.

[30] Foreign Application Priority Data

Feb. 14, 1990 [JP] Japan .................. 2-034321

[51] Int. Cl.⁵ ............................................. H02F 7/00
[52] U.S. Cl. .................................. 318/254; 318/439; 318/721
[58] Field of Search .......... 318/254, 10, 439, 799–812, 318/721

[56] References Cited

U.S. PATENT DOCUMENTS

| | | | |
|---|---|---|---|
| 4,651,067 | 3/1987 | Ito et al. | 318/254 |
| 4,694,210 | 9/1987 | Elliott et al. | 318/439 X |
| 4,712,050 | 12/1987 | Nagasawa et al. | 318/254 |
| 4,743,815 | 5/1988 | Gee et al. | 318/254 |
| 4,780,651 | 10/1988 | Nakano et al. | 318/254 |
| 4,983,894 | 1/1991 | Oku et al. | 318/138 |

FOREIGN PATENT DOCUMENTS

| | | |
|---|---|---|
| 3934139A1 | 4/1990 | Germany . |
| 57-160385 | 10/1982 | Japan . |
| 61-88785 | 5/1986 | Japan . |
| 61-112590 | 5/1986 | Japan . |
| 61-191290A | 8/1986 | Japan . |
| 199491A | 4/1989 | Japan . |
| 1209988A | 8/1989 | Japan . |
| 232790A | 2/1990 | Japan . |

OTHER PUBLICATIONS

Kenichi Iizuka, et al "Microcomputer Control for Sensorless Brushless Motor," IEEE Transactions on Industry Applications, vol. IA-21, No. 4, 1985, pp. 595–601.

*Primary Examiner*—Jonathan Wysocki
*Attorney, Agent, or Firm*—Stevens, Davis, Miller & Mosher

[57] ABSTRACT

A brushless motor operating apparatus includes a DC power source 1, a group 2 of semiconductor switching elements for passing/interrupting a current to an armature winding 4 of a brushless motor 3, a plurality of filter circuits 6 for waveform-processing induced voltages induced in the armature winding 4, a comparison circuit 7 for comparing outputs of the plurality of filter circuits 6 and a composite wave thereof, a control circuit 8 for making ON/OFF control of the semiconductor switching element group 2 in accordance with an output of the comparison circuit 7, the filter circuit 6 having a construction in which condensers 6c and 6e are connected behind and in series with a voltage divider circuit composed of a plurality of resistors 6a and 6b and an integrating circuit 6d is connected behind the condensers 6c and 6e, whereby the condensers 6c and 6e in the filter circuit 6 can be provided with ones having a low withstanding voltage, thereby making it possible to reduce the size and cost of the apparatus.

2 Claims, 6 Drawing Sheets

BRUSHLESS MOTOR OPERATING APPARATUS PROVIDED WITH A FILTER HAVING A VOLTAGE DIVIDER CIRCUIT

This application is a continuation of application Ser. No. 07/768,545, filed Sep. 30, 1992 (abandoned).

TECHNICAL FIELD

The present invention relates to a brushless motor, and more particularly to an apparatus for operating a brushless motor of a type in which the relative position of a magnet rotator and an armature winding is detected from an induced voltage induced in the armature winding and the brushless motor is operated on the basis of the position detection signal.

BACKGROUND ART

Usually, a brushless motor needs a detector for detecting the position of magnetic poles of a rotator of the motor. However, for example, in the case where it is difficult to use the pole position detector, there is employed a method in which the pole position detector is omitted and a commutation signal of the motor is generated on the basis of a voltage signal induced in an armature winding. This method will now be explained.

FIG. 1 is a diagram showing the construction of a brushless motor operating apparatus according to the above method. Reference numeral 1 designates a DC power source and numeral 2 designates a semiconductor switching element group which is composed of six transistors U to Z and six diodes connected in inverse parallel with the transistors. Numeral 3 designates a brushless motor which is composed of a three-phase connected armature winding 4 and a magnet rotator 5. Numeral 6 designates a filter circuit for waveform-processing a voltage signal induced in the armature winding 4, numeral 7 a comparison circuit for comparing output signals of the filter circuit 6, and numeral 8 a control circuit for making ON/OFF control of the semiconductor switching element group 2 in accordance with an output signal of the comparison circuit 7. The filter circuit 6 comprises a circuit in which an integrating circuit is connected behind a differentiating circuit, as shown in FIG. 4 (A) or a circuit in which a differentiating circuit is connected behind an integrating circuit, as shown in FIG. 4 (B).

An operation in the above-mentioned construction will be explained by use of FIGS. 2 and 3.

FIG. 2 shows a relationship between a voltage signal induced in the armature winding 4, an output signal of the filter circuit 6 and an output signal of the comparison circuit 7 for one phase or U phase. In the figure, an output signal obtained by waveform-processing an induced voltage $V_u$ for U phase by a filter circuit 6U is shown by 60U Also, induced voltages $V_v$ and $V_w$ for V and W phases are waveform-processed by filter circuits 6V and 6W so that they become 60V and 60W. A composite waveform of 60V and 60W is shown by 71U. The comparison circuit 7 compares the signals 60U and 71U to obtain a comparison circuit output signal 70U. This output signal serves as a position detection signal representative of the position of the magnet rotator 5.

The above-mentioned waveform processing is performed also for the V and W phases, thereby obtaining position detection signals 70V and 70W, respectively. The position detection signals 70V and 70W, respectively. The position detection signals 70U to 70W are signals which are different in phase from one another by 120° C., as shown in FIG. 3. These position detection signals are subjected to a logical operation in the control circuit 8 to generate commutation signals 8U to 8Z. The transistors in the semiconductor switching element group 2 are switched by those commutation signals, thereby causing the brushless motor 3 to continuously generate a rotational torque. The above operation mode is called a position detection operation mode.

On the other hand, during a time when the brushless motor 3 is stopped, no induced voltage is generated. Upon starting, therefore, commutation signals 8U to 8Z as shown in FIG. 3 are externally applied at a low frequency to forcibly rotate the brushless motor 3 at a low speed. By this rotation, induced voltages are generated in the armature winding 4. The induced voltages are waveform-processed by the filter circuit 6 and are then compared in the comparison circuit 7 to obtain position detection signals 70U to 70W as shown in FIG. 3. The above operation mode is called a synchronized operation mode. At the point of time when such position detection signals have been settled in the synchronized operation mode, transition is made to a position detection operation mode in which the brushless motor is operated on the basis of the position detection signals.

However, the construction of the filter circuit as shown in FIG. 4 brings about the increase in size and cost of the apparatus since a high withstanding voltage on a level with the power source voltage is required for a condenser 6c of the differentiating circuit or a condenser 6e of the integrating circuit. Also, in many cases, an electrolytic condenser is used for the possession of a high withstanding voltage and an appropriate electrostatic capacitance and for reduction in size. However, since the electrolytic condenser has inferior high frequency characteristics, the stability of a position detection signal during a change, in load is deteriorated and hence the motor is liable to encounter an out-of-step phenomenon upon change in load.

Further, in both the circuit constructions shown in FIGS. 4(A) and 4(B), the condenser 6c in the differentiating circuit has no discharging path. Therefore, the condenser always has a DC component always when the brushless motor is stopped. When the brushless motor is started in such a state, the output of the filter circuit immediately after the start of a synchronized operation mode (for example, an output signal 60U for U phase) also has a DC component as shown by dotted line in FIG. 5. Accordingly, there is involved a problem that if the DC component is not attenuated upon transition to a position detection operation mode, a failure in transition is liable occur.

DISCLOSURE OF INVENTION

Therefore, a brushless motor operating apparatus according to the present invention comprises a DC power source, a group of semiconductor switching elements for passing/interrupting a current to an armature winding of a brushless motor, a plurality of filter circuits for waveform-processing induced voltages induced in the armature winding, a comparison circuit for comparing outputs of the plurality of filter circuits and a composite wave thereof, and a control circuit for making ON/OFF control of the semiconductor switching element group in accordance with an output of the comparison circuit, the filter circuit having a construction in which a condenser is connected behind and in series with a voltage divider circuit composed of a plurality of resistors and an integrating circuit is connected behind the condenser.

The condenser in the filter circuit can be provided with one having a low withstanding voltage, thereby making it possible to reduce the size and cost of the apparatus. Further, the usability of a low withstanding voltage facilitates the use of a small-sized condenser having a better high frequency characteristic, thereby realizing the stabilization of a position detection signal during a change in load, etc. and the elongation of the life time of the circuit. Also, the provision of a discharging path for the condenser enables smooth transition from a synchronized operation mode to a position detection operation made without a remaining DC component in the condenser upon starting of the brushless motor.

BEST MODE FOR CARRING OUT THE INVENTION

An embodiment of the present invention will now be described in reference to the drawings.

Figure 1:
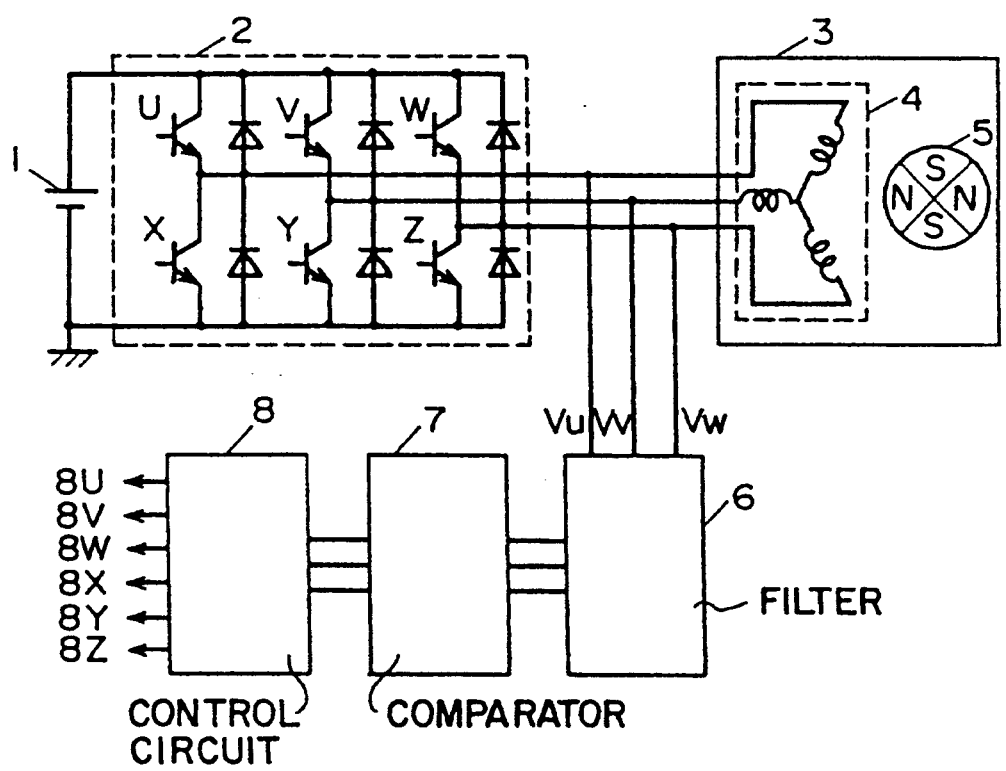
FIG. 1 is a diagram showing the construction of the conventional brushless motor operating apparatus.
Figure 2:
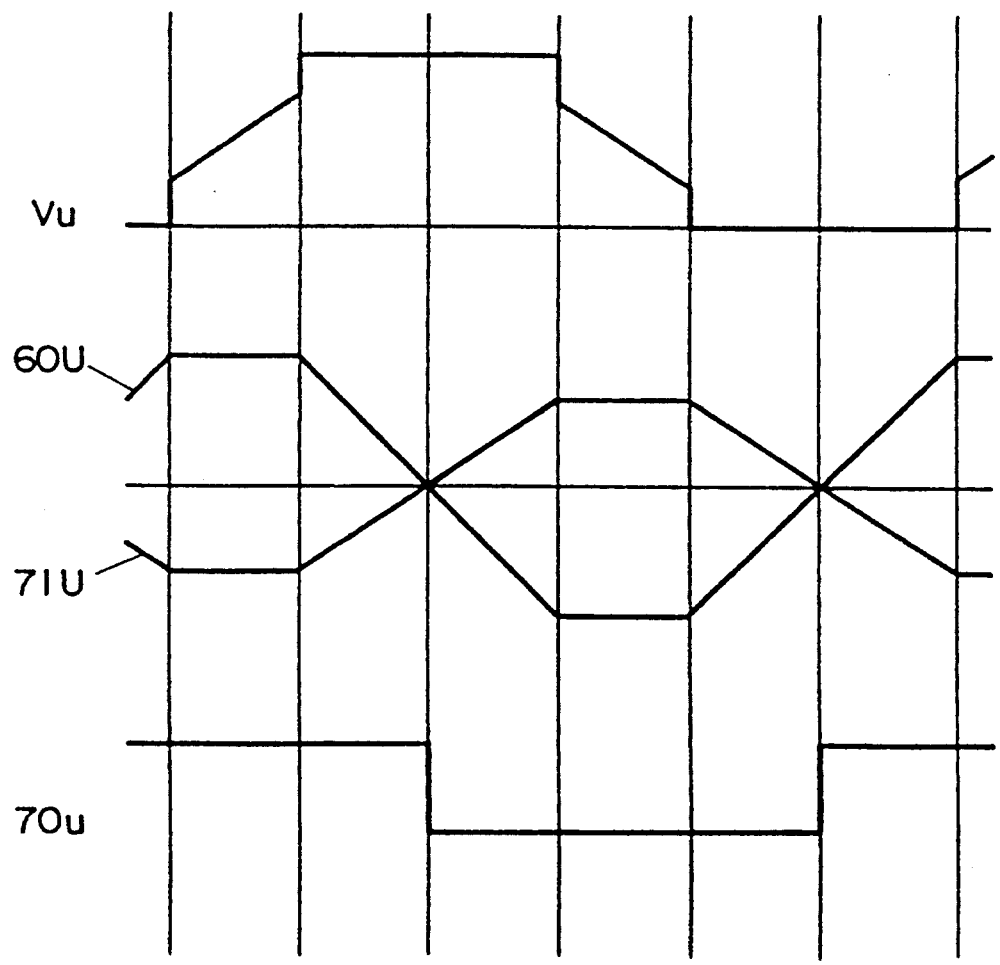
FIG. 2 is a diagram showing the waveforms of respective parts in a filter circuit and a comparison circuit of the conventional apparatus.

Since the schematic construction of the brushless motor operating apparatus according to the embodiment of the present invention is similar to that in the conventional apparatus shown in FIG. 1, explanation thereof will be omitted.

Figure 3:
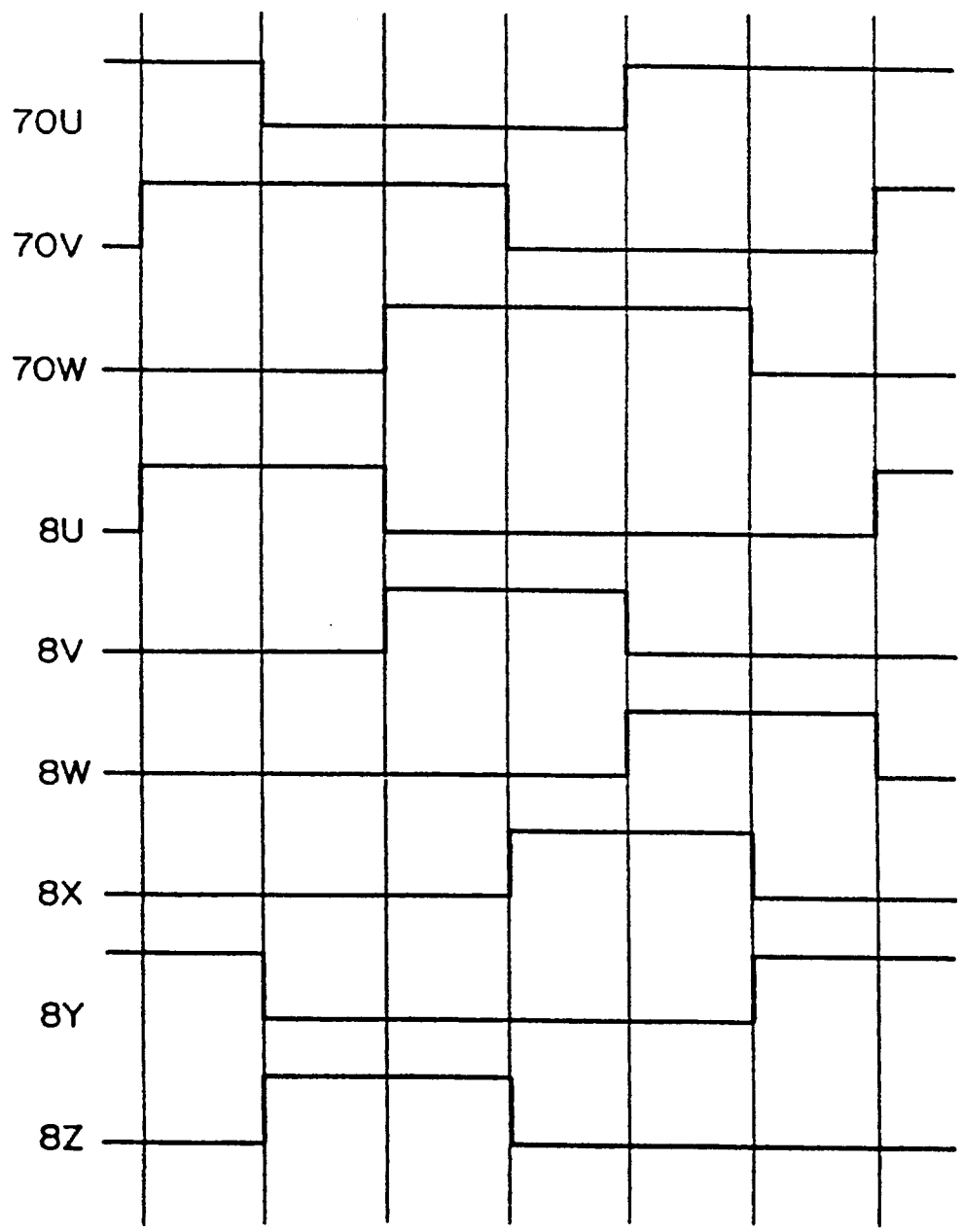
FIG. 3 is a timing chart of position detection signals and commutation signals in the conventional apparatus.
Figure 4A:
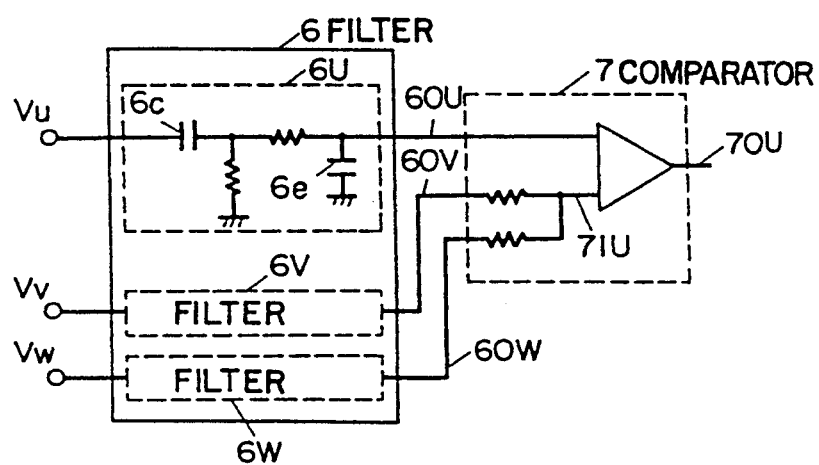
FIGS. 4(A), 4(B) are diagrams showing the construction of the filter circuit in the conventional apparatus.
Figure 4B:
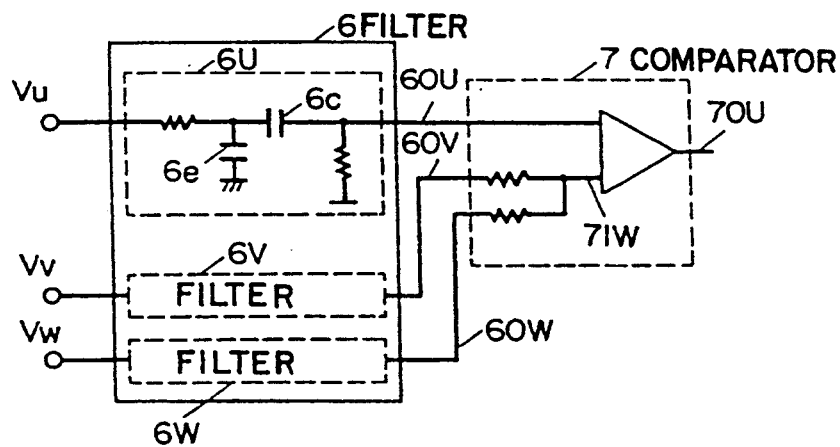
Figure 5:
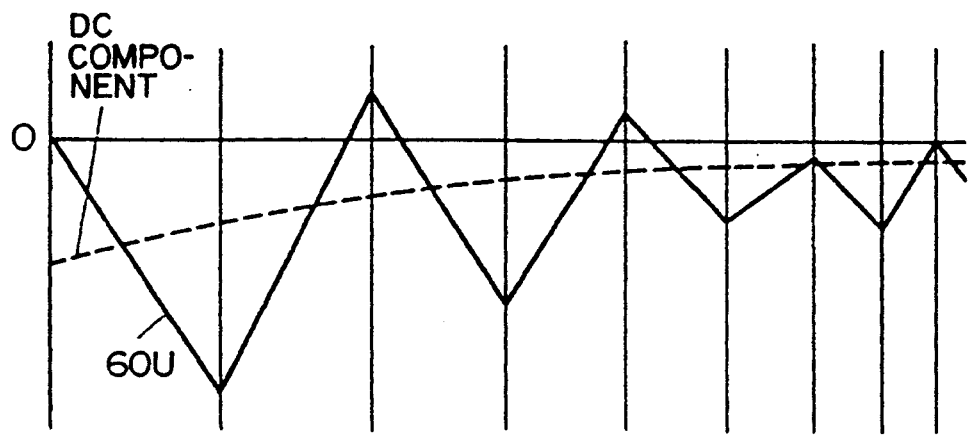
FIG. 5 is a diagram showing an output waveform of the filter circuit in the conventional apparatus.
Figure 6:
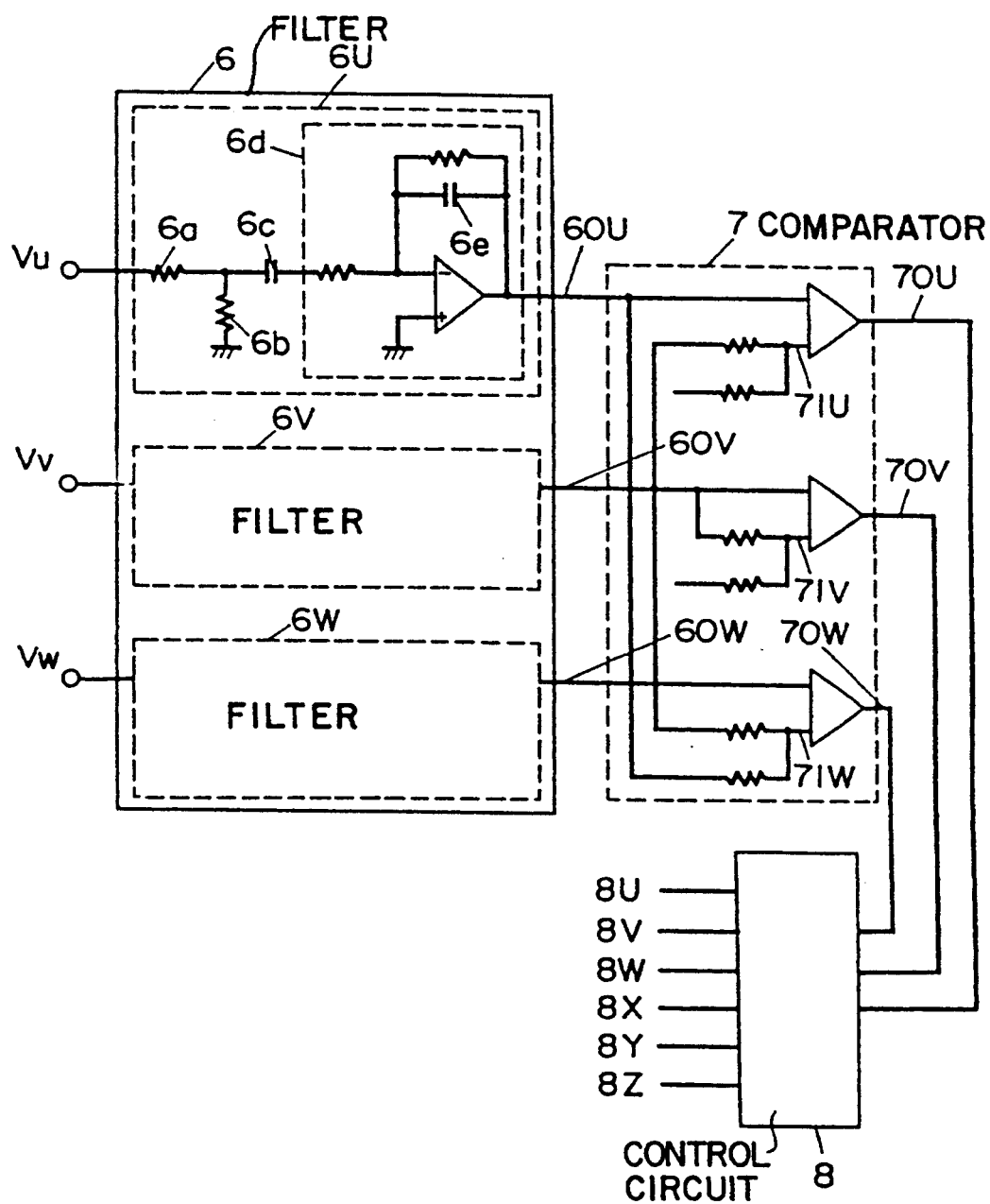
FIG. 6 is a diagram showing the construction of a main part of a brushless motor operating apparatus according to an embodiment of the present invention.

FIG. 6 is a diagram showing the construction of a filter circuit 6, a comparison circuit 7 and a control circuit 8 in the embodiment. The filter circuits. 6 is composed of filter circuits 6U, 6V and 6W for waveform-processing induced voltages for U, V and W phases. The filter circuit 6U is composed of resistors 6a and 6b, a condenser 6c and an integrating circuit 6d. The condenser 6c is connected behind and in series with a voltage divider circuit composed of the resistors 6a and 6b and the integrating circuit 6d is connected behind the condenser 6c. The comparison circuit 7 compares each one of the filter circuit outputs 60U to 60W for three phases with a composite wave of the two other outputs to produce position detection signals 70U to 70W. On the basis of the position detection signals 70U to 70W, the control circuit 8 generates commutation signals 8U to 8Z as shown in FIG. 3.

With the above construction, for example, in the case of the U phase, the induced voltage $V_u$ of the armature winding is divided by the resistors 6a and 6b and a voltage across the resistor 6b is $6b/(6a+6b) \times V_u$. By properly selecting this division ratio, it is possible to suppress the voltage across the resistor 6b to a lower level. Thereby, it becomes possible to use low voltage circuits for circuits following the resistor 6b and hence it becomes possible to use condensers of low withstanding voltage as the condensers 6c and 6e used in the differentiating circuit and the integrating circuit.

Also, since a DC component stored in the condenser 6c of the differentiating circuit is discharged through the resistor 6b, there is no fear that a DC component remains in the condenser 6c when the brushless motor is stopped. Accordingly, smooth transition from a synchronized operation mode to a position detection operation mode upon next start is possible.

Though the above explanation is made of the U phase, the similar holds for the V and W phases. Also, through in the present embodiment, a circuit using an operational amplifier is used for the integrating circuit, a first-order lag circuit including resistors and condensers may be used.

INDUSTRIAL APPLICABILITY

As has been mentioned above, the present invention is provided with a DC power source, a group of semiconductor switching elements for passing/interrupting a current to an armature winding of a brushless motor, a plurality of filter circuits for waveform-processing induced voltages induced in the armature winding, a comparison circuit for comparing outputs of the plurality of filter circuits and a composite wave thereof, and a control circuit for making ON/OFF control of the semiconductor switching element group in accordance with an output of the comparison circuit, the filter circuit having a construction in which a condenser is connected behind and in series with a voltage divider circuit composed of a plurality of resistors and an integrated circuit is connected behind the condenser, whereby the condenser in the filter circuit can be provided with one having a low withstanding voltage, thereby making it possible to reduce the size and cost of the apparatus.

Further, the usability of a low withstanding voltage facilitates the use of a small-sized condenser having a better high frequency characteristic, thereby realizing the stabilization of a position detection signal for a change in load, etc. and the elongation of the life time of the circuit.

Also, the provision of a discharging path for the condenser enables smooth transition from a synchronized operation mode to a position detection operation mode without a remaining DC component in the condenser upon activation of the brushless motor.

I claim:
1. A brushless motor operating apparatus comprising:
    a brushless motor having a plural-phase armature winding connected with an ungrounded neutral point and a magnet rotator;
    a DC power source;
    a group of semiconductor switching elements for passing/interrupting current to said armature winding,
    a plurality of filter circuit means, each operatively associated with a phase of said armature winding, for wave-form processing induced voltages in said armature winding, each of said filter circuit means comprising:
    a voltage divider circuit having an input end, operatively associated with a phase of said armature winding, and an output end,
    a condenser having a first end, operatively connected in series with said output end of said voltage divider circuit, and a second end, and an integrating circuit having an input end, operatively connected with said second end, and an output end;
a comparison circuit means for comparing outputs from said integrating circuit of said plurality of filter circuit means with a composite wave comprising a plurality of said outputs, and generating an output; and
a control circuit for controlling said semiconductor switching element group in accordance with said output of said comparison circuit.

2. A brushless motor operating apparatus, as claimed in claim 1, wherein said integrating circuit comprises:
an operational amplifier having a plurality of inputs, and an output;
a first resistor means connected across one of said inputs of said operational amplifier and said output;
a capacitor connected in parallel with said first resistor means, and
a second resistor means connected to one of said inputs of said operational amplifier and connected to said condensor.

* * * * *